Figure 1:
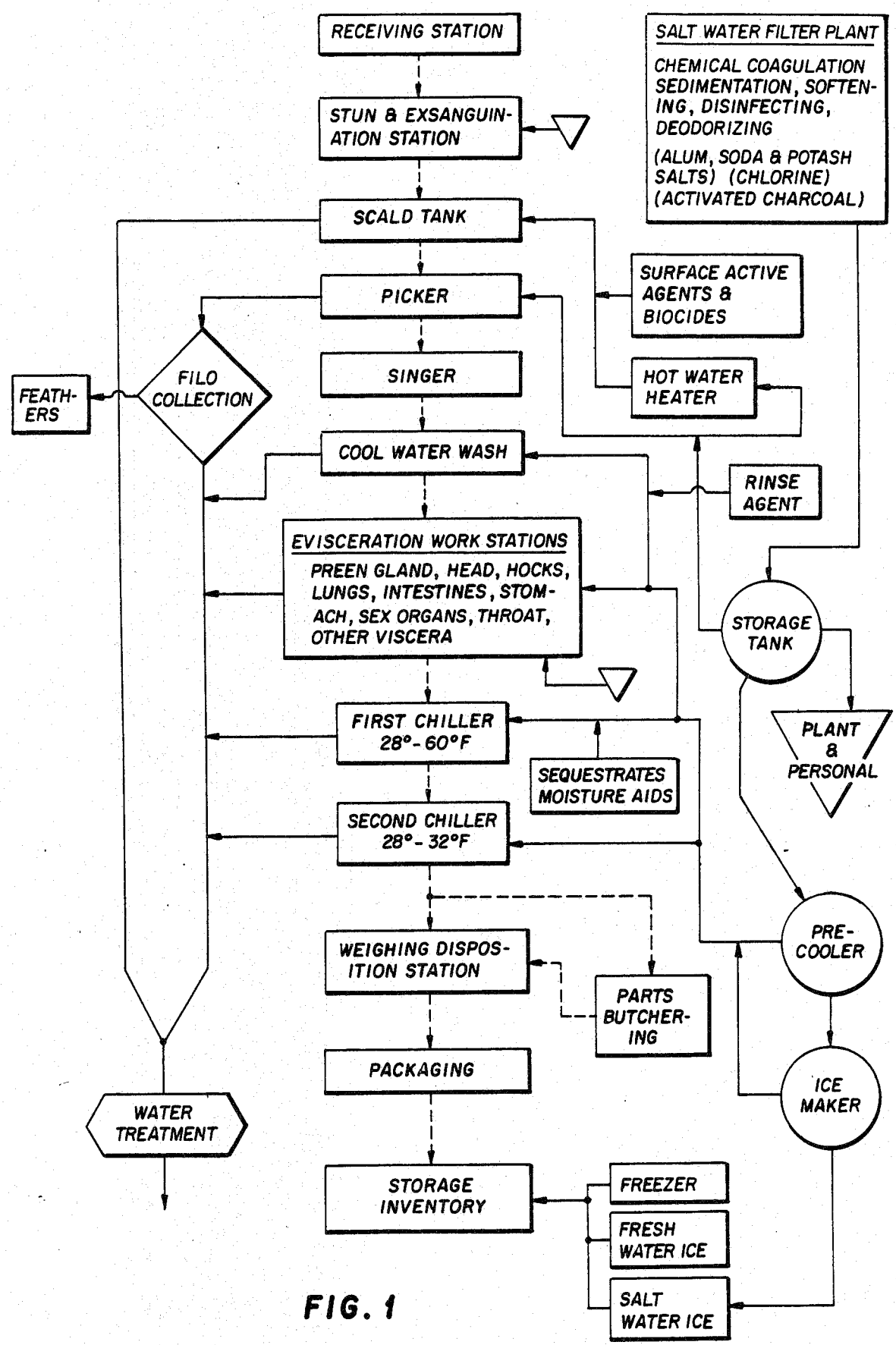

United States Patent [19]

Brockington et al.

[11] Patent Number: 4,667,370

[45] Date of Patent: May 26, 1987

[54] SALT-WATER BUTCHERING PROCESS FOR POULTRY AND OTHER FOWL

[76] Inventors: F. Rhett Brockington, 4016 MacGregor Dr.; William Z. Foster, Suite 314, 5516 Lakeshore Dr., both of Columbia, S.C. 29206

[21] Appl. No.: 723,067

[22] Filed: Apr. 15, 1985

[51] Int. Cl.[4] .......................................... A22C 21/00
[52] U.S. Cl. ........................................ 17/51; 17/11
[58] Field of Search ............................. 17/11, 51, 45

[56] References Cited

U.S. PATENT DOCUMENTS 4,372,099 2/1983 Linville .............................. 17/11 X Primary Examiner—Willie G. Abercrombie

[57] ABSTRACT

A process for butchering poultry and other fowl wherein salt-water is used in full or partial substitution for fresh-water, said substitution being enabled by using the disclosed method of water treatment at each of the process stations, said treatment encompassing the appropriate addition of surface active agents, antimicrobial agents, sequestrates, antiscaling compounds and carefully controlling the water temperature, said substitution being further enabled through the use of additional wash stations and the use of injected salt solutions, and in which the salt-water process produces a fully dressed product having a lowered level of bacteria as opposed to the conventional fresh-water process.

1 Claim, 1 Drawing Figure

SALT-WATER BUTCHERING PROCESS FOR POULTRY AND OTHER FOWL

INTRODUCTION

Poultry farming and processing is by far and away the most technologically perfected food science in the United States and in Western Europe. It is without question the most viable means of providing a meat source for feeding the world's growing hungry masses of humanity. This development has come about as a result of the largely unheralded contributions of relatively few scientist located in the southern part of the United States. Advances in the breeding, feeding, hatching, health and housing coupled with increased automation of the butchering process have resulted in indoor farms where a broiler reaches maturity in 6 to 8 weeks, gains ¾ of a pound in body weight for every pound of food consumed, and occupies less than 3 square feet as a mature bird just prior to harvesting. Disease, which could be devastating in such high density environments, has been controlled to where better than 90% broiler yields are routinely attained. Indoor farms have essentially eliminated weather factors, and also allow very large flocks to be farmed in the vicinity of the butchering plants. This is crucial to the operating economics of a modern processing plant as very high throughputs must be maintained to offset the cost of capitalizing the automated processing equipment. The advent of poultry science has had the effect of concentrating the industry around the big processing plants. To process one bird 10 to 15 gallons of potable water are required, and a moderate size processing plant can easily butcher 100,000 birds in a day, resulting in a water demand of 1 to 1.5 million gallons per day. The demand period will span no more than 12 to 14 hours. For many communities this heavy demand represents a considerable percentage of the total capacity of the water filtering plant. The effluent waters of the processing plant generally have BOD's 5 to 10 times that of "normal" sewage, and the municipal sewage treatment plant must be sized accordingly for this large influx. Until relatively recently many of the processing plants effluent streams were not treated at all, but simply returned to the river or lake. Three factors have necessitated in waste treatment prior to return. They are:

1. Increased poultry consumption in the U.S. (37.3 lbs. per capita in 1970 to 51 lbs. in 1980).
2. Increased industrialization.
3. Increased urban concentration.

The cost of providing potable water and adequate sewage treatment has risen sharply as the demand for water has increased along with the incident of reuse. A growing world population will assure this trend of an ever increasing demand for water.

The butchering process methods that have continued to provide a high quality, cost effective product were developed with certain knowledge that abundant amounts of fresh water would be available. In areas, such as in the southeastern part of the United States, this is still largely the case, and there has been a tremendous growth of the poultry industry. However, there are many areas in the world where the population density has reached a point where competition for water is intense, and the poultry industry has not fared well in these areas even in light of the technological advances. Ironically, in many cases there is sufficient water to raise the broilers as their life time consumption of water is only around 1½ to 2 gallons, but because the processing plant requires 8 to 10 times as much water, the industry is not amendable to automation. For instance, in the U.S. Virgin Islands, the population has grown 15% in the 10 year period (1970-1980), but the poultry consumption has fallen to a quarter of the 1970 figure over that same period. The U.S. Virgin Islands have no substained fresh water reservoirs and therefore no inexpensive, readily available supply of water for a processing plant. The island, being surrounded by salt-water, is unable to compete with even distantly located processors due to the high cost of desalinizing the sea water as opposed to having abundant fresh-water supplies. The seas, oceans and the other saline water bodies account for roughly 98% of the world's water, and methods for utilizing these saline waters have to be devised if the growing demands for water are to be met. The instant invention is one such method.

We have found a method wherein salt-water, when modified with the disclosed additives and utilized in the disclosed fashion can be substituted in full or part, for the potable fresh-water used in a poultry butchering process. Furthermore, we have found that the salt-water process, besides being cost effective has additional advantages over a fresh-water process. Salt-water in the context of this disclosure refers to ocean water. Ocean water is relatively uniform throughout the world having a range of salinity from 34.1 to 36.2 parts per thousand. The composition of ocean water is given in tables 1 and 2. Salt-water being extremely plentiful and independent of climactic conditions has a natural salinity which inhibits growth of fresh-water and terrestrial bacteria. During processing this will lower the potential for cross contamination. Salt-water has a lower concentration of man made contaminants than most fresh-water especially chlorinated organics. Other than dilution there are present indigenous halophilic bacteria, which digest chlorinated organic compounds. The process plants effluent waters can be metabolized by higher order animals.

DESCRIPTION OF THE INVENTION

We have found that purified salt-water can be used in a conventional butchering process in partial replacement for fresh-water. Typically, the salt-water would not be used in applications involving direct food contact, but restricted to clean up and wash down operations. The water requirement for these operations is not insignificant, often amounting to 3 to 5 gallons per bird.

For direct food contact applications, chemical additives are required to offset the effects of the salts in the water if comparable quality and process efficiencies are to be maintained. Minor changes in the butchering process operations are also required. FIG. 1 is a flow diagram of the disclosed process which illustrates how the water system has to be adapted to the butchering process. The movement of the bird is shown with dashed lines and the flow of the water is shown with solid lines. The plant wide personal usage distribution system is not shown in entirety for purpose of clarity and is represented by a triangle. The personal usage system, as well as being used for piecemeal hand operations, area cleanup and sundry work steps not specificaly identified, could also be used for sewage treatment and refrigeration. The incoming salt-water is purified prior to any plant use, whether to direct food applications or ancillary operations. At a minimum clarification and disinfection are required. There are multiple methods for purifying water and a relatively comprehensive list is given in Table 3. We have found that the preferred method is chemical coagulation with alum to remove the bulk of the suspended solids. A practical limit for the subsidence period should be no longer than 10 hours. A dosage of 900 lbs. of lime-soda ash per 1 million gallons of water is sufficient to soften the water for use with a scale and corrosion resistant plastic (vinyl, fiberglass, polypropylene) water distribution system. Greater amounts of softening agents are required if traditional galvanized pipes are used, as scaling is more of a problem. The plant is designed such that all plumbing is accessible. Sedimentation is followed by rapid sand filtration. Activated carbon can be used to remove odorous components from salt-water, but has a much shorter working life expectancy than with fresh-water. We have found that in evaluating a site as a potential plant location that if a significant odor problem exists it is more practical to change plant locations. The preferred disinfectant is chlorine. Haloforms are not as severe a problem with salt-water and the additional expense of using more disinfectants (C102, BaCl) and others are not merited. A 20 ppm dose of chlorine kills 99+% of the bacteria.

The purified water is then pumped to an elevated, darkened tank for storage. From the storage tank the water is distributed to the scald bath hot water heater, the precooler, the designated work stations and the personal usage systems.

The scald bath hot water heater minimizes evaporation and reduces scaling in the scald bath. The heater permits faster response to process fluctuations. We have found that much of the technology that has been developed for the tub of a dishwasher is applicable to the design of the heater and the scald bath. Electrical heating elements that can be easily replaced are placed in intimate contact with the water. The heater and scald bath can be constructed of any suitable material including wood and metal. We have found resinous plastics such as polycarbonate or fiberglass to be preferred, because they are less subject to scaling, last indefinitely when properly maintained and can easily be repaired. A flow rate of ⅛-½ gallons of water per bird is maintained for each bird dipped into the scald bath. The temperature of the water in the heater and in the scald bath is 126-140 degrees Fahrenheit. The preferred temperature is 131 degrees Fahrenheit.

One or more additives are added to the scald bath water to control foam, improve wetting of the carcass, emulsify oils and glandular exudates and to disperse dirt and other solids. The additives can be introduced directly to the bath or preferably in line with the water from the heater, prior to the scald bath as shown in FIG. 1. Antimicrobial agents and antioxidants may also be added. The additives and concentration determined by the Federal Food and Drug Administration found to be generally recognized as safe (GRAS) are preferred for all applications in the United States.

We have found that in order to achieve satisfactory wetting, a wetting agent is required, preferably having a cloud point of 60+ degrees Centigrade. BASF Pluronic polyol P123 (MW5750, cloud point 1% 90 degrees Centigrade) is preferred. It is FDA approved for scald bath applications. An antifoam compound is necessary with a salt-water process. A preferred antifoam is Union Carbide's silicon—SAG 5300. Preliminary work with 2,4,7,9 tetramethyl 5-decyn 4,7 diol, which is not currently FDA approved for direct food contact appears to be a superior wetting agent. Is is effective for saline solutions even at concentrations below 0.1%. It is essentially foam free and exhibits mild bactericidal action.

The carcass is then deplumed and rinsed using a conventionalpicker with ambient temperature salt-water. The waste water run off is collected in open troughs which flow to a screening device where the feathers are partitioned from the water.

The remaining filo plumes are removed at the singeing work station with a gas fired burner.

The carcass is then thoroughly washed in an agitated wash bath filled with cool salt-water. We have found the optimum temperature to be 50-60 degrees Fahrenheit. Cool water is more effective than warm for removing residual wetting agents. Bacteria growth is minimized and there is reduced salt uptake during submersion. The carcass, when subjected to the described conditions retains moisture longer, therein delaying evaporation which would result in salt deposition on the skin. While cold water is preferred, wash water temperatures below 40 degrees Fahrenheit were found to be uncomfortably cool for hand held work and conventional, automated process equipment performed less efficiently. As stated, the wash water will leave salt deposits on the carcass' skin surface as the water evaporates. Given sufficient time, these deposits impart a slightly crusty appearance to the skin, and in areas of heavy deposition the skin takes on a darker hue where the salts desiccated the skin. We have found two methods that will eliminate the discoloration. In the first method the carcass is periodically re-wet in cold water as it progresses through the evisceration work stations, thereby preventing drying. In the second method the salt-water is blown off the carcass when it emerges from the wash bath with a jet of pressurized air. The carcass is then rewashed using fresh-water. A rinse agent such as one manufactured by Klensaid which tends to bead the water, can be incorporated in the salt-water wash to aid in blowing off the water.

The carcass then progresses through the evisceration work stations where the preen gland is removed, the carcass is separated from the shackles by removing the hocks, the intestinal viscera, following an incision to the rear panel are removed, the carcass is cropped, the lungs, stomach, heart, gizzard, liver, ex organs etc. are removed and the bird is thoroughly inspected to assure that it is fully dressed.

The carcass is then chilled and remoistened using one or more cold water bath chillers and auxiliary equipment. In the embodiment as shown in FIG. 1 there are two chillers, both of which are supplied cold water from the precooler. The first chiller operated at a bath temperature of 35-45 degrees Fahrenheit. The second chiller is a saline slush ice bath, and the operational temperature will be the equilibrium temperature of a saline ice-water mixture. This temperature is slightly lower than fresh-water and is 28.6-32 degrees Fahrenheit. The ice in this mixture is generated by the salt-water ice maker which utilizes water from the precooler. Water and ice are combined in the second chiller to form the slush ice mixture. The carcass is cooled to 40 degrees Fahrenheit in the first chiller and to approximately 32 degrees Fahrenheit in the second chiller. While in the chillers, the body weight increases 6-14% as water is absorbed. There are a number of factors that influence this percentage; among them are dwell times in the bath, salinity ad surface tension. Using the disclosed chiller temperature a practical working minimum dwell time of 20 minutes, 10 minutes in each chiller, results in a 2½ lb. broiler having a 7½ water uptake. The addition of a silicone wetting agent to the first chiller increased the water uptake to 8%. Anionic surfactants such as the trisodium phosphate and other multi sodium phosphate compounds are marginally effective wetting agents in salt-water in part because the osmotic pressure is already considerably lower and the additional sodium ions further lower the pressure. The sodium phosphate compounds however appear to depress the uptake of multi-valent metal ions, and therefore are useful for minimizing the taste imparted by these metals to the carcass. The prior art teaches that sodium phosphate salt solutions can be used to dramatically increase water uptake when injected into the carcass just prior to entering the chillers. We have found that by using this technique that the water uptake can be raised to 12% under the disclosed chiller conditions. At 12% the skin begins to take on a translucent appearance.

The carcass can be further butchered into pieces prior to weighing and packing. We have found that if storage is going to be for 36 hours or less, that the bird can be preserved with salt water ice. If the time in storage will be for an extended period, then the bird should be packaged in a water tight container, such as a plastic bag, before being packed in ice. Of course, if available, potable fresh-water ice represents an alternative. Novel Features of the Invention The instant invention is unique in that the poultry butchering process has the characteristics enumerated below:

1. Salt-water is used instead of fresh-water and it follows that:
    (a) there is essentially a limitless supply thus assuring that water will always be available, independent of population and climatic influences;
    (b) dilution and indigenous halophilic bacteria reduces the level of man-made contaminants and in particular interest are haloforms (i.e. chloroform) which are generated via traditional fresh-water disinfection procedures;
    (c) the process plant can be located in geographic areas which herebefore were not acceptable because potable fresh-water was unavailable;
    (d) salt-water process effluents can be adopted to a wide range of novel waste treatment methods, some of which might even be profitable;
    (e) the salinity inhibits bacteria growth and therein further reduces the possibility of cross contamination;
    (f) lower freezing point water improves the efficiency of the slush ice chillers and reduces bacterial growth;
    (g) salt-water ice is superior to fresh-water ice as a packing preservative in that bacterial growth is inhibited by the lower freezing point and the salinity.

2. The scald bath is supplied water from a hot water heater which:
    (a) improves the overall efficiency of heating the water because no heat is lost through evaporation;
    (b) improves the ability of the system to respond to the process rate fluctuations;
    (c) reduces scaling in the scald tank.

3. The carcass is washed and rewashed as necessary with cool water after being deplumed which:
    (a) reduces loss of a body weight due to evaporation;
    (b) prevents the skin from drying out and discoloring;
    (c) keeps the carcass at a near constant temperature;
    (d) lowers the body temperature to where it can be easily handled, cut and eviscerated by both man and automated equipment, thereby improving overall flow through the system;
    (e) removes scald both chemical residuals which usually have a higher solubility in cool water than in hot.

4. Several chemical additives have been found to have excellent utility as processing aids, especially in a salt-water system, which have herebefore not been known to possess utility in conventional poultry processing and they are:
    (a) 2,4,7,9-tetramethyl 5-decyn, 4,7 diol added to the scald bath water appears to have bactericidal activity as well as being an excellent wetting and defoaming agent even at very low concentrations. It is probable that at the specified concentrations it would be acceptable for use as a poultry processing additive as defined by the Federal Food and Drug Administration
    (b) Sodium (poly) phosphates when added to the chillers appear to sequester and (or) depress the uptake of di and tri valent metal salts which can impart taste to the carcass, as well as reduce scaling for which they are already known. The preferred phosphates are tri sodium phosphate and tetra sodium pyrophosphate.

What we claim is:

1. A method of butchering poultry and other fowl, through the use of oceanic saltwater in full or partial substitution for freshwater, to minimize bacteriological cross contamination, exposure to chlorinated organic compounds and dwell time in the chiller, consisting of the steps of cutting the bird's jugular blood vessel and allowing sufficient time for exsanguination;
scalding the bird in purified water which has been treated with one or more of the following: surface active agents, wetting agents, defoamers, soaps, detergents, emulsifiers, antifoams, antioxidants, antimicrocides and antiscaling compounds;
defeathering the carcass in a picker which is washed down with a spray of ambient temperature water;
singeing off remaining filo plumes;
washing the carcass in water supplied by a precooler, and rewashing as necessary throughout the evisceration steps thus assuring that the carcass does not dry out;
cutting and washing the preen gland, dehocking, eviscerating, cropping, removing lungs, stomach, sex organds, gizzard, liver, heart and other viscera;
chilling the carcass in one or more chillers filled with oceanic saltwater, said chiller(s) being operated below the freezing point of water;
dispositioning the dressed bird as to further butchering operations, packaging and shipping.

* * * * *